March 13, 1962 G. A. DADAS 3,025,405

HIGH SENSITIVITY CONTROL DEVICE

Filed Dec. 17, 1958

INVENTOR.
GUST A. DADAS

BY Alfred C Body

ATTORNEY 3,025,405
HIGH SENSITIVITY CONTROL DEVICE

Gust A. Dadas, Cleveland, Ohio, assignor to Pyronics, Inc., Cleveland, Ohio, a corporation of Ohio Filed Dec. 17, 1958, Ser. No. 781,101
4 Claims. (Cl. 250—218)

This invention relates to a control device which operates in response to variations in the level of a liquid.

It has been proposed heretofore to provide a photo-electrically operated control device which operates in response to variations in the level of an opaque liquid. In such prior control devices the opaque liquid was contained in a vertically disposed passage or chamber. The upper surface of the liquid would rise or fall depending upon the variations in some condition, such as the pressure on the liquid. While such devices have been found suitable for many purposes, they were not sufficiently sensitive for certain applications.

The present invention is directed to a control device of this general type having a novel arrangement which improves its sensitivity over the previous devices for this same purpose.

In accordance with the present invention the opaque liquid is contained in a tube which has transparent flat parallel top and bottom walls which are inclined at a relatively slight angle to the horizontal. A suitable light source and a photo-electric cell are disposed above and below the tube, and the position of the surface of the liquid within the tube determines whether or not the photo-electric cell is activated by light. The photo-electric cell in turn controls any suitable control means, such as a relay. An important feature of the present invention is that the spacing between the transparent top and bottom walls of the tube is sufficiently small that the surface tension of the liquid will tend to maintain the surface or meniscus of the liquid substantially perpendicular to these walls at all times, so that improved operation at the cut-off region is achieved. Preferably, the present invention also includes an opaque mask which is disposed between the photo-electric cell and the adjacent transparent wall of the tube. This mask has a slit for passing light which is narrow in the direction in which the liquid moves along the tube, so as to enhance the sharp cut-off effect, and is relatively wide from side to side across the tube to enhance the sensitivity of the device.

An object of the present invention is to provide a novel and improved control device which operates in response to variations in the level of a liquid.

It is also an object of this invention to provide such a control device which has improved sensitivity.

Another object of this invention is to provide such a control device which has a sharp and well-defined cut-off when the liquid level moves past a certain critical point.

A further object of this invention is to provide such a control device whose sensitivity can be adjusted readily.

Further objects and advantages of this invention will be apparent from the following description of certain presently preferred embodiments thereof, which are illustrated in the accompanying drawings. In the drawing.

Figure 1:
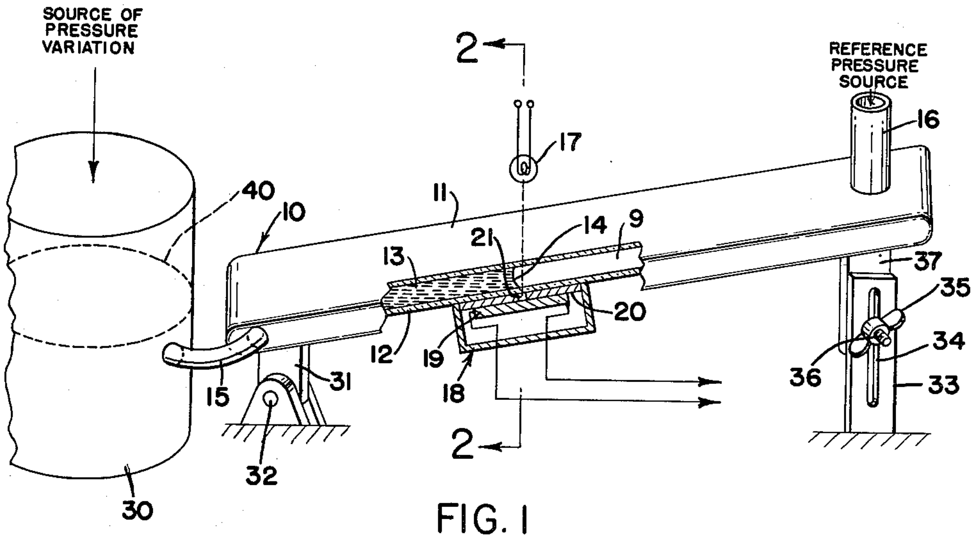
FIGURE 1 is a schematic perspective view of one embodiment of the present control device, partly broken away for clarity, and shown connected to a liquid reservoir whose liquid surface is exposed to pressure variations.
Figure 2:
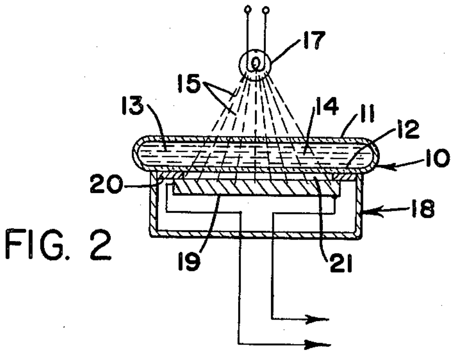
FIGURE 2 is a cross-sectional view of this device, taken along the lines 2—2 in FIGURE 1.

Referring first to FIGURES 1 and 2, the embodiment of the present invention illustrated comprises an elongated tube 10 of suitable transparent material, such as glass, defining an elongated passage 9. This tube is supported in such a manner that the longitudinal axis of the passage is inclined at a relatively slight angle to the horizontal. The tube and passage are generally elongated in transverse cross section in a horizontal direction transverse to the longitudinal axis of the passage. As such, the tube has relatively wide, flat top and bottom walls, 11, 12 having inner and outer surfaces which respectively define the upper and lower surfaces of the passage 9 and the outer dimension of the tube. These surfaces each extend parallel to each other and horizontally in a direction transverse to the longitudinal axis of the passage 9. A suitable opaque liquid 13 partially fills the passage 9, such that the upper surface or meniscus 14 will be disposed midway between the longitudinal ends of the passage 9. The inner surfaces of the top and bottom walls, 11, 12 are spaced sufficiently close together such that the surface tension of the liquid 13 will tend to maintain the latter's surface 14 substantially perpendicular to the surfaces of the tube walls 11, 12 at all times. This is extremely important to the effectiveness of the present invention, as will be apparent hereinafter.

In one practical embodiment, the spacing between the top and bottom walls 11 and 12 of the tube is ⅛ inch and the liquid 13 is a blue standard gauge oil having a specific gravity of 0.827. Spacings up to $\frac{3}{16}$ inch may be employed.

At the lower end of the tube 10 a passage 15 is connected between the tube and a liquid reservoir 30. The reservoir contains liquid 40 whose surface is exposed to pressure variations. The area of the surface of the liquid in the reservoir 30 is substantially greater than, and preferably is at least ten times, the cross-sectional area of the tube 10, so that a given change in the level of the liquid in the reservoir 30, due to pressure variations, will produce a greatly amplified movement of the surface of the liquid in the tube 10.

The upper end of the tube 10 is connected through a passage 16 to a suitable reference pressure source, such as the atmosphere.

Obviously, the position of the surface or meniscus 14 of the liquid 13 in the tube 10 will depend upon the pressure differential between the variable pressure source which acts on the liquid in the reservoir 30 and the reference pressure source which communicates with the upper end of the tube 10.

In the embodiment shown in FIGURES 1 and 2, the suitable light source 17 is positioned over lying the tube 10 so that light will shine on a line through the transparent top and bottom walls, 11, 12 to a suitable light-sensitive cell 19, such line being rotated between the ends of the passage 9 such that as the liquid 13 moves longitudinally in the passage 9, the meniscus will cut across such line and interrupt the flow of light to the photo-electric cell.

In the embodiment of the invention, the photoelectric cell 19 is positioned in a housing 18 mounted on the flat bottom wall 12. In one practical embodiment the photo-electric cell is of the wafer or disc type containing suitable semi-conductor material. An opaque mask 20 which has a slit 21 therein is interposed between the bottom wall 12 of the tube 10 and the photo-electric cell 19. From FIGURES 1 and 2 it will be apparent that the slit 21 is quite narrow in the direction in which the surface of the opaque liquid 13 moves along the tube 10 in response to pressure variations, that is, in the longitudinal direction of the passage 9. This enhances the sharp cut-off characteristic of the present control device. The slit 21 is relatively wide from side-to-side across the tube 10, that is, in a direction transverse to the longitudinal length of the passage 9. The photo-electric cell is completely exposed across the entire width of this slit. Due to this arrangement, the light beam which impinges upon the photo-electric cell is relatively wide from side-to-side across the tube 10, thereby enhancing the sensitivity of the device.

In the operation of this device, when the surface 14 of the opaque liquid 13 in the tube is to the left of the slit 21 in FIGURE 1, light will be transmitted from the light source 17 through the transparent top and bottom walls 11 and 12 of the tube and through the slit 21 to the photo-cell 19. Thus, the photo-cell will be energized by this beam of light. However, when the pressure on the surface of the liquid in the reservoir 30 increases, the level of the opaque liquid 13 will rise along the tube 10, and at some predetermined pressure the surface 14 of this liquid will move across the slit 21, thereby cutting off completely the light transmission to the photo-electric cell 19.

As already pointed out, the spacing between the top and bottom walls 11 and 12 of the tube 10 is sufficiently close that the surface 14 of the opaque liquid will tend to be substantially perpendicular to these walls, rather than approximately horizontal, as it would be if the walls were spaced appreciably farther apart. Because of this novel arrangement, when the surface 14 of the opaque liquid moves across the slit 21 a substantial portion of the entire depth of the opaque liquid will be positioned to intercept light and prevent it from passing through the slit 21. This provides a sharp and well-defined cut-off for the photo-electric cell 19. This result would not be possible if the surface 14 of the liquid were approximately horizontal, which would be the case if the top and bottom walls 11 and 12 of the tube were so widely spaced that the surface tension of the liquid would be ineffective to maintain its suface more nearly perpendicular to these tube walls. If that were true, the leading edge of the surface 14 would pass across the slit 21 substantially before the remainder of this surface. Thus only a shallow depth of the opaque liquid would be blocking the slit 21. Some of the light from the light source would pass through this shallow liquid and impinge upon the photo-electric cell. Thus, the cut-off of the photo-electric cell would tend to be more gradual, rather than abrupt and well-defined. As a consequence, chattering of the relay which is controlled by the photo-electric cell would tend to occur.

The lower limit on the spacing between the top and bottom tube walls is determined by the reduced opacity of the liquid 13 at its depth between the top and bottom walls is decreased. At some minimum spacing the liquid will not be sufficiently opaque to provide the desired sharp and well-defined demarcation between energization and de-energization of the photo-electric cell. With blue gage oil the optimum spacing is from ⅛ to $^3/_{16}$ inch with ⅛ inch preferred.

Because of the relatively great width of the top and bottom walls 11 and 12 of the tube and the width of the slit 21 from side-to-side across the tube, the total amount of light transmitted through the transparent walls of the tube and through the slit 21 to the photo-electric cell 19 is appreciably greater than would be possible with a tube of the usual circular cross-section. Consequently, this construction enhances the sensitivity of the present control device.

In order to change the sensitivity of the present control device, it is only necessary to change the angle of inclination of the tube 10. A suitable mounting which permits such adjustment to be made is illustrated schematically in FIGURE 1. Here the lower end of the tube 10 is mounted on a support bracket 31 which has a fixed pivot at 32. The upper end of the tube 10 has attached thereto a depending arm 37 which cooperates with an elongated upstanding bracket 33 formed with an elongated vertical slot 34. The vertical position of the upper end of the tube 10 may be adjusted by means of a screw 36 connected to the arm 37 and slidably is received in the slit 34, and a wing nut 35. The wing nut may be tightened to clamp the upper end of tube 10 at any desired level.

Obviously, a wide variety of other equivalent mounting arrangements for the tube 10 may be provided for the purpose of enabling its angle of inclination to be adjusted readily.

With any such adjustable mounting arrangement, the sensitivity of the device can be reduced by inclining the tube 10 at a greater angle to the horizontal. Conversely, the sensitivity of the control device can be increased by decreasing the angle of inclination of the tube 10 with respect to the horizontal.

Figure 3:
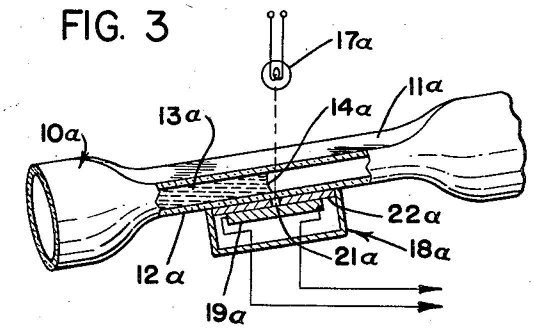
FIGURE 3 is a fragmentary perspective view of an alternative embodiment of the present control device, partly broken away for clarity.

FIGURE 3 illustrates schematically an alternative embodiment of this invention. In FIGURE 3 the same reference numerals are used for the elements which correspond to those shown in FIGURES 1 and 2, with the subscript "*a*" added.

In this embodiment, the tube **10*a* is a glass tube of the usual round cross-section. This tube is flattened midway along its length to provide flat parallel top and bottom walls 11*a* and 12*a*. These top and bottom walls are positioned sufficiently close to each other that the surface tension of the opaque liquid 13*a* will tend to maintain its surface 14*a* substantially perpendicular to the top and bottom walls 11*a* and 12*a***.

In other respects, the embodiment of FIGURE 3 is essentially the same as that shown in FIGURES 1 and 2, and a further detailed description of this alternative embodiment is considered to be unnecessary.

Obviously, various other arrangements which differ from the particular constructions illustrated in the drawings may be adopted without departing from the spirit and scope of this invention. For example, the light source might be positioned below the tube 10 and the photo-cell 19 above it, if desired. Also, the variable pressure source might be connected to the upper end of the tube to control the liquid level therein. For some applications, the slitted opaque mask 20 may be omitted, although to do so will detract somewhat from the performance of the present control device. Also, the tube 10 need not be transparent throughout its entire length, provided its top and bottom walls are transparent in the region of the critical liquid level. Moreover, it is to be understood, that the control device may be arranged so that the liquid level will rise or fall in response to some other variable than pressure—for example, temperature.

Also, it will be apparent that the present control device is suitable for use in combination with other measuring devices not specifically shown. For example, the tube 10 may be connected in the upper leg of a standard U-shaped manometer tube.

Therefore, it is to be understood that while there have been described herein and illustrated schematically certain embodiments of this invention, various modifications, omissions and refinements which depart from the disclosed embodiments may be adopted without departing from the spirit and scope of the presnet invention, and that the present invention may be used in combination with a variety of other devices which are responsive to some variable conditions, such as pressure or temperature.

Having thus described my invention, I claim:

1. In a control device comprised of a light source, a light sensitive cell, a transparent tube defining a passage disposed on the line between said source and said cell and a liquid in said passage having an upper surface adapted to move across said line and block passage of light to said cell, the improvement which comprises: said tube and passage having a longitudinal axis disposed at a relatively slight angle to the horizontal, said tube and passage having a horizontally elongated transverse cross-sectional shape each defined by substantially flat upper and lower surfaces all parallel to each other and horizontal in a direction transverse to the length of said tube.

2. The improvement of claim 1 wherein said upper and lower surfaces of said passage are spaced sufficiently close together that the surface tension of the liquid will tend to maintain the surface of the liquid substantially perpendicular to said upper and lower surfaces.

3. The improvement of claim 1 wherein the upper and lower surfaces of said passage are spaced apart a distance within the range from substantially ⅛ inch to substantially $\frac{3}{16}$ inch.

4. The improvement of claim 1 including an opaque mask between said cell and the adjacent surface of said tube, said mask having a slit generally elongated in a direction transverse to and narrow in a direction parallel to the longitudinal length of said tube.

References Cited in the file of this patent

UNITED STATES PATENTS

| | | |
|---|---|---|
| Re. 15,080 | Bailey | Apr. 12, 1921 |
| 1,002,635 | Bratkowski | Sept. 5, 1911 |
| 2,118,029 | Boyd | May 24, 1938 |
| 2,193,315 | Evelyn | Mar. 12, 1940 |
| 2,197,190 | Mott-Smith | Apr. 16, 1940 |
| 2,240,988 | Hertel | May 6, 1941 |
| 2,490,627 | Hofberg | Dec. 6, 1949 |